United States Patent
Lagerwey et al.

[15] 3,672,472

[45] June 27, 1972

[54] VIBRATION DAMPERS FOR RAPIDLY ROTATING BODIES OF REVOLUTION

[72] Inventors: Johannes Lagerwey, Leidschendam; Hendrik J. Ijlstra, Weesp; George F. J. Andriesse, Amsterdam, all of Netherlands

[73] Assignee: Reactor Centrum Nederland, (Stichting), an Institute of the Netherlands

[22] Filed: Sept. 15, 1970

[21] Appl. No.: 72,257

[30] Foreign Application Priority Data

Sept. 22, 1969 Netherlands..........................69.14317

[52] U.S. Cl..............................................188/1 B, 188/268
[51] Int. Cl.......................................................F16f 7/10
[58] Field of Search...........................188/1 B, 266, 268, 269

[56] References Cited

UNITED STATES PATENTS

| | | |
|---|---|---|
| 2,466,327 | 4/1949 | Rieber.....................................188/1 B |
| 3,113,640 | 12/1963 | Stedman.................................188/1 B |
| 3,266,600 | 8/1966 | Brunner..................................188/1 B |
| 3,424,448 | 1/1969 | Chak Ma...........................188/268 X |
| 3,491,857 | 1/1970 | Reed........................................188/1 B |

Primary Examiner—Duane A. Reger
Attorney—Cushman, Darby & Cushman

[57] ABSTRACT

Vibration damper for a fast spinning body of revolution, comprising a hermetically closed vessel, a damping member coupled with said body through a deformable wall portion of said vessel, an elastically compressible solid body contained in said vessel and liquid filling the space left in said vessel completely.

3 Claims, 1 Drawing Figure

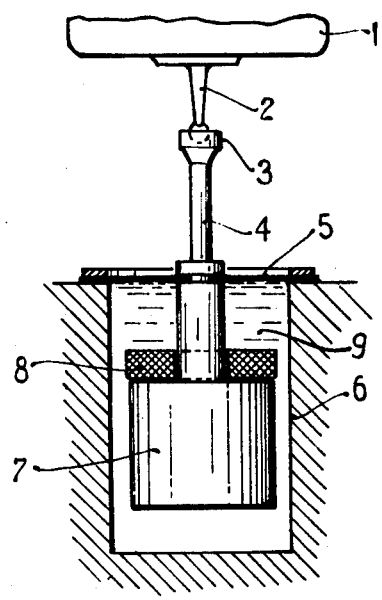

VIBRATION DAMPERS FOR RAPIDLY ROTATING BODIES OF REVOLUTION

The invention relates to a vibration damper for a body of revolution rotating rapidly about its axis, said damper being provided with a hermetically closed vessel filled with liquid and a damping member contained in said vessel and immersed in said liquid, said damping member being adapted to move in respect of the vessel against a resetting force and coupled with the body of revolution via a deformable wall portion of the vessel.

The Dutch Pat. application 66.07482 discloses a vibration damper of this kind, in which the space within the vessel and outside the damping member is completely or almost completely filled with liquid. It has appeared, that in a thus constructed vibration damper the deformation of the deformable wall portion of the vessel due to the expansion and the shrinkage of the liquid mass at temperature variations can result in an unacceptable change of the characteristics of the vibration damper and said change of said characteristics can be restored to acceptable values if the vessel contains except liquid a relatively large quantity of gas, which would mean a liquid mass with a free surface. However, when a liquid mass with free surface is used cavitation can easily happen at high vibration frequences, that means empty cavities would be produced between the damping member and the liquid mass, whereby the damping action of the liquid will be considerably decreased and erosion of the damping member will occur. Moreover, the gas could then act corrodingly on the deformable wall portion, whereby said wall portion, when constructed as a thin diaphragm exposed to high loads, would be unacceptably damaged in a short time.

The invention provides a vibration damper of the meant kind, in which a quantity of gas may be contained in the vessel which is large in respect of the one or more small gas bubbles allowed in the vessel of the known vibration damper but the liquid mass does not form a free surface. It consists in that also an elastically compressible body is provided in the vessel and the space within the vessel and outside the damping member and said compressible body is completely filled with liquid. The compressible body may consist of foam material with closed cells. If the volume of the compressible body is well chosen the influence of the thermal pressure variations of the gas on the characteristics of the damper can be made negligeable small. If the compressible body is provided on the damping member the relatively large quantity of gas contained in said body appears to have a favorable influence on the damping of axial vibrations of the rapidly rotating body of revolution and the damping member coupled therewith, so that the vibration damper has a favorable effect in all directions.

The invention will be further elucidated with the aid of the drawing, which illustrates partly an axial sectional view, partly an elevational view of a vibration damper according to the invention.

In the drawing a body of revolution mounted for rapid rotation about a vertical axis is designated by 1. Said body rests by means of a pintle 2 on a vertical supporting rod 4 which is provided with a bearing socket 3. The supporting rod 4 is attached to a diaphragm 5 which forms the deformable upper wall of a hermetically closed vessel 6 of a vibration damper. The supporting rod 4 extends through the diaphragm into the vessel 6 and carries at its lower end a damping member 7. Mounted on this damping member and surrounding the lower end of the supporting rod 4 is an elastically compressible annular body 8, e.g. a body of foam material with closed cells. The space 9 within the vessel 6 and outside the damping member 7 and the elastically compressible body 8 is completely filled with liquid. The body 8 has such a volume that it is able to take up the thermal volume variations of the liquid and the change of pressure exerted on the diaphragm 5 at a variation of temperature has only a negligeable influence on the characteristics of the vibration damper. If the body 8 is lighter than the liquid displaced thereby it can be attached to the damping member 7 by glue or fastening means.

It will be apparent that the elastically compressible body 8 may also occupy an other place in the vessel.

Since the characteristics of the vibration damper do not depend on the already known factors, such as the mass and the shape of the damping member, the damping gap, the volume and the viscosity of the damping liquid, the mass and the rigidity of the diaphragm, etc., but also on the mass, the shape and the elasticity of the elastically compressible body, said characteristics can be adapted to the exigences by choosing said body correctly.

What we claim is:

1. A vibration damper for a body of revolution rotating rapidly about its axis, comprising a hermetically closed vessel filled with liquid, a damping member contained in said vessel and immersed in said liquid, a deformable wall portion forming part of said vessel, said damping member being adapted to move in said vessel against a resetting force and coupled with the body of revolution via said deformable wall portion, and an elastically compressible body provided in said vessel, the space within said vessel and outside said damping member and said compressible body being completely filled with liquid.

2. A vibration damper as claimed in claim 1, in which the elastically compressible body consists of foam material, of which the cells are closed.

3. A vibration damper as claimed in claim 1, in which the elastically compressible body is mounted on the damping member.

* * * * *